INVENTOR.
WILBUR V. HOLSINGER
BY
William Cleland
ATTY.

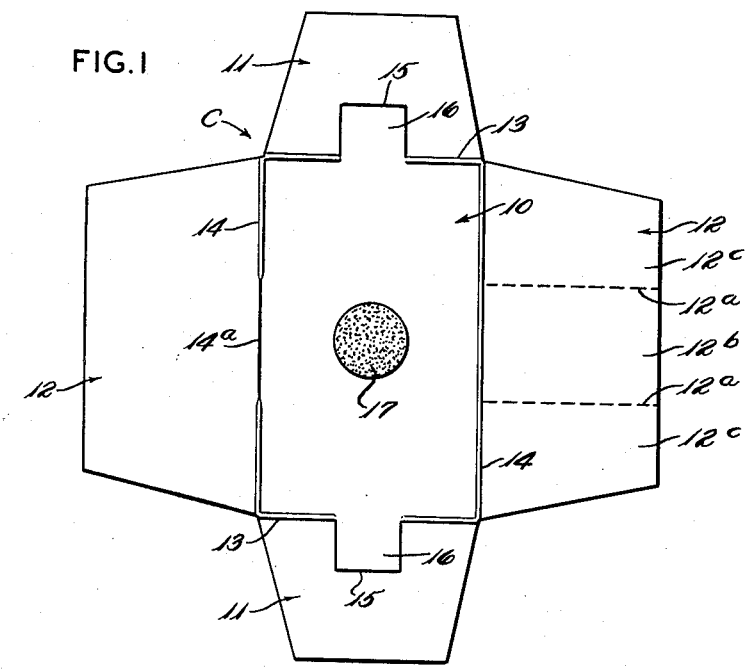
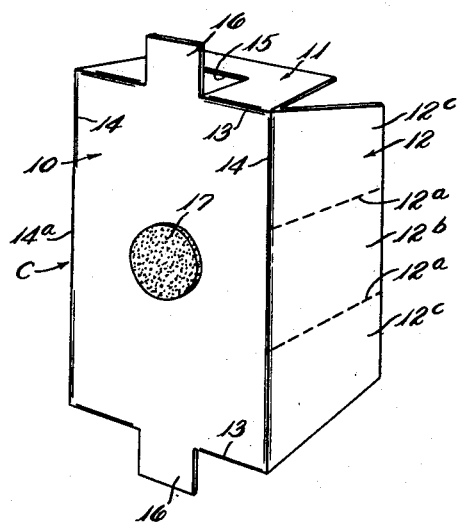
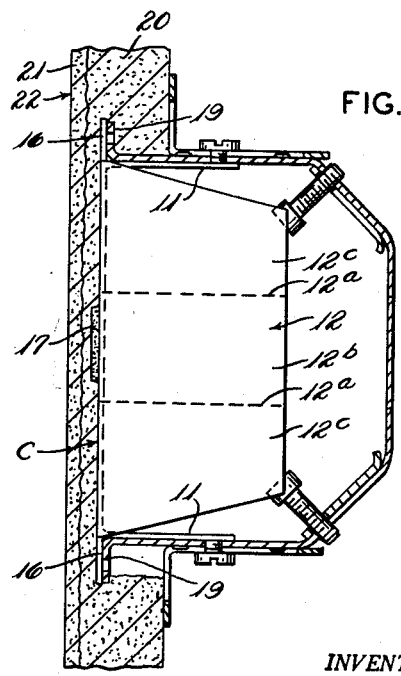

United States Patent Office

3,059,803
Patented Oct. 23, 1962

3,059,803
DEVICE FOR PROTECTING AND LOCATING OUTLET BOXES OR THE LIKE IN PLASTERED WALLS
Wilbur V. Holsinger, Peninsula, Ohio, assignor to Paragon Development, Inc., Cuyahoga Falls, Ohio, a corporation of Ohio
Filed Apr. 30, 1959, Ser. No. 810,040
12 Claims. (Cl. 220—3.4)

This invention relates to a device for locating knockout points in newly plastered walls, and in paritcular relates to a device for protecting and locating electrical outlet boxes in such plastered walls.

Heretofore, protective covers have been suggested for electrical outlet boxes to prevent the same from becoming plastered over. In some instances these covers were provided with outwardly projecting protuberances to facilitate locating the boxes, but these protuberances often were covered over with plaster so that there was no way to locate the boxes.

One object of the invention is to provide means in the form of a temporary outlet box cover, for example, adapted to be completely covered with plaster, but having thereon improved means affected by moisture in the plaster automatically to provide a visible indication of the location of the respective outlet box.

Another object of the invention is to provide a locating device of the character described, including improved means for releasing a coloring material through the plaster toward the exposed surface of the same, before the colored area of the plaster has a chance to become sufficiently set to stop outward migration to said exposed surface.

Another object of the invention is to provide a locating device of the character described which can be produced at a relatively low cost which makes the same practical as a single use outlet box cover and/or as give-away item.

Another object of the invention is to provide an outlet box cover having improved means for combining the same with another like box cover for use in a double sized outlet box, for example.

These and other objects of the invention will be manifest from the following brief description and the accompanying drawings.

Of the accompanying drawings:

FIGURE 1 is a top plan view of a one-piece blank for an electrical outlet box cover, embodying the features of the invention.

FIGURE 2 is a perspective view of the cover shown in FIGURE 1, but illustrated in folded condition for positioning the same in a standard outlet box.

FIGURE 3 is a vertical cross-section through an electrical outlet box incorporated in a newly plastered wall, and with the improved outlet box cover positioned therein to prevent the plaster from entering the box.

Figure 4:
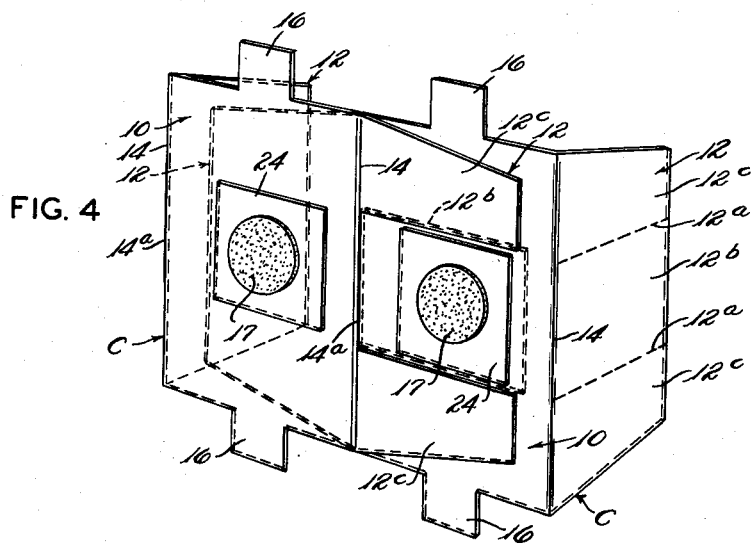
FIGURE 4 is a perspective view, corresponding to FIGURE 2, illustrating the manner of interconnecting two outlet box covers for use in a double outlet box.

Referring particularly to FIGURE 1, there is illustrated an outlet box cover C, formed as a one-piece blank, from thin, but sturdy, deformable cardboard stock, which has been cut and scored to define a rectangular panel 10, opposite end flaps 11, 11, and opposite side flaps 12, 12. The end and side flaps 11 and 12 are foldable inwardly, along the scored lines 13, 13, and 14, 14, respectively, as shown in FIGURE 2. U-shaped cuts 15, 15 in the end flaps 11, and extending from the scored lines 13, define tabs 16, 16, which in the FIGURE 2 condition are punched out to extend in the plane of the panel 10, for purposes to be described later. Although the one-piece blank is referred to as being of cardboard, it also may be of other bendable or foldable materials, such as synthetic resin plastic. Cardboard, however, has been found to be most economical as a one use item.

As best shown in FIGURE 1, the blank may have an elongated slit 14a therethrough, coextensive with one said scored line 14 and centrally of the same. Extending from the opposite scored line 14 to the outer edge of the respective flap 12, may be spaced perforation lines 12a, 12a, along which the flap may be torn or severed to define a central tongue 12b aligned with the slit 14a, and spaced end tongues 12c, 12c. The tongue 12b is of width corresponding to the length of the slit 14a of a like box cover for securely holding two such covers together in use, in a way which will be described later.

Provided on the front face of the cover panel 10, may be means 17 which when exposed to water will release coloring matter, in the manner and for purposes to be described later. Said means may be in the form of a relatively small daub or spot of hardened paste, which is a mixture of water soluble retarder for gypsum plaster, and a water soluble dye. As an example, the daub 17 may be a mixture of glue and a ten percent (10%) solution of mercurochrome. The retarder, however, may be any commercial retarder for gypsum plaster, including the usual brown coat and the usual white or finish coat. The daub 17 may be applied to panel 10 in form of a wet paste and allowed to adhere tenaciously to the panel, and to dry into a hard, dry lump or protuberance which cannot readily be removed.

The paste material of the daub 17 may include combinations of other retarders with a crystalline dye and suitable means soluble in water for forming the same into hardenable paste. Examples of commercial retarders suitable for the present purposes include materials made from partial hydrolytic degradation of the proteins of horns, hoofs, and hair. Other retarders include cream of tartar, gelatin, ammonia, sulphate of zinc, dextrine, gum, soap, starch and animal or vegetable mineral oil. These retarders, in various degrees, and when moistened in the daub 17 by the wet plaster, are absorbed in the initially formed gypsum nuclei and thereby inhibit the crystal growth.

In use of the improved cover, it is folded as shown in FIGURE 2, and inserted within an outlet box 18, of known type, with the flaps extending inwardly and to have the central panel 10 substantially flush with the outer rim of the box, as shown in FIGURE 3. In this position, the small tabs 16 extend over the usual ears 19, 19 provided on the box for attachment of the usual metal cover plate (not shown), to prevent entry of plaster into the usual screw threads of the ears. The tabs 16 serve a second purpose of retaining the cover with the panel 10 flush with the outer edge portions 18a of box 18. Provision of the tabs 16 also make it possible to omit the end flaps 11.

Thus when brown and white layers 20 and 21, of gypsum plaster are applied to the wall 21 in known manner, the plaster may be applied over the protective cover or panel 10, which prevents passage of plaster to the box and its contents.

The brown layer 20 of gypsum plaster (containing an aggregate of perlite, vermiculite, or sand), applied while wet and pasty, normally sets or hardens in four to six hours, while the white coat 21 of gypsum plaster (containing lime and plaster of Paris), similarly wet and pasty and separately applied, generally sets within one hour. The glue retarder in the daub 17, however, upon dissolving into the water of the adjacent plaster portions, retards the setting of said plaster portions sufficiently to allow the red Mercurochrome die to permeate completely through the plaster layer or layers before the same can become completely set or hardened. In actual practice with the materials specified the dye is plainly visible on the outer face of the plaster in twelve hours or less. In any event, when plaster is applied on a given day, an electrician seeing the red dye spot on the following day, can remove the cardboard protective cover C after first breaking away the plaster formed over the cover panel 10.

Referring to FIGURE 4 there is illustrated the manner of folding two covers C for use on a double-sized electrical outlet box (not shown), wherein the extended tongue 12b of one cover C is inserted through the slit 14a of the cover C. The corresponding end tongues 12c, 12c being extended over the outside of panel 10, so as not to interfere with wiring or other obstructions inside the outlet box.

Figure 5:
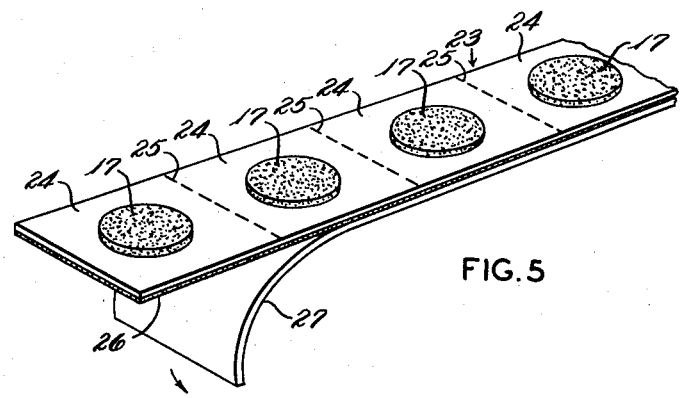
FIGURE 5 is a fragmentary perspective view of a continuous tape from which box locating means may be dispensed, as for application to outlet box covers.

Referring to FIGURE 5 there is illustrated a continuous tape 23 having uniformly spaced daubs 17 of the aforementioned color-releasing material. The tape 23 may be of water-proofed paper or other flexible water-impervious material adapted to be separated into segments or squares 24, 24 as indicated by perforation lines 25, 25. The underside of the tape may have a coating of water-impervious tacky adhesive 26, protected by a removable paper or like backing strip 27. Thus, the squares 24 are adapted to be applied to the cover panels 10, as shown in FIGURE 4, by means of suitable automatic means, after removal of the protective strip 27. Squares 24 may be dispensed from the tape 23 for application directly to sheet lath or the like prior to application of wet plaster, for subsequent location of given points in a plastered wall, such as for locating blind points at which piping or wiring connections are to be found.

Modifications of the invention may be resorted to without departing from the spirit thereof or the scope of the appended claims.

What is claimed is:

1. A device for locating a point behind plaster on a plastered object, comprising a member attachable to the object prior to application of the plaster, means on said member for attaching the same to the object, said member having attached thereto a water-soluble mixture of a dye and a material which will retard the setting of newly applied plaster adjacent thereto.

2. A device as set forth in claim 1, wherein said mixture is a commercial water-soluble retarder for gypsum plaster and a water soluble dye.

3. A device as set forth in claim 1, wherein said mixture is glue and Mercurochrome in the form of a water soluble coating of dried, hard paste.

4. A plaster retaining cover as for an electrical outlet box having an access opening, comprising a one-piece blank of relatively thin bendable material scored to define a central panel and oppositely disposed flaps adapted to be inturned along the respective scoring, said blank having a slit along the scoring at one side of said panel and the flaps at the opposite side thereof having means defining a tongue defined therein from the respective scoring to the outer edge of the flap and the tongue adapted to be formed from the respective flaps and received in the slit of a like cover to hold the like covers together for use in a correspondingly enlarged access opening.

5. A plaster retaining cover as set forth in claim 4, wherein said means defining said tongue is spaced perforation lines in said opposite side flap.

6. A plaster retaining cover as set forth in claim 5, wherein the outer face of said panel has attached thereto a hard dry member which is a soluble mixture of a dye and a material which will retard the setting of newly applied plaster adjacent thereto to allow the dye to permeate through a substantial thickness of gypsum plaster.

7. A device for locating a point behind plaster on a plastered wall, comprising a thin flexible member having attached to one side thereof at least one plaster coloring portion which is a hard dry paste composed of a soluble dye and a soluble retarder for gypsum plaster, and means on the opposite side of said member for attaching the same to a portion of a wall being plastered.

8. A device as set forth in claim 7, wherein said attaching means is a coating of water impervious tacky adhesive, and a layer of protective material being removably adhered to said tacky adhesive to protect the same until time of use.

9. A device as set forth in claim 8, said member being an elongated strip of moisture impervious material providing a plurality of separable said coloring portions.

10. A device as set forth in claim 9, said strip having weakened portions for facilitating removal of said separable coloring portions.

11. A plaster retaining cover as for an electrical outlet box having a rectangular access opening, comprising a member made of thin, relatively stiff but deformable material to have a central rectangular panel approximating the size of the opening in the box, and means on said member defining oppositely disposed flaps of broad lateral area which are deformable to inturned relationship with respect to the side edges of the central panel for engaging corresponding sides of the box to substantial inward extent, and thereby to retain said central panel in position to close the access opening, said central panel having adhered on the outer face thereof a daub of normally dry, hard paste including a water soluble mixture of a dye and a material which will retard the setting of newly applied gypsum plaster thereto and over said central panel.

12. A retaining cover as set forth in claim 11, wherein said retarder is a commercial retarder for gypsum plaster and said dye is a solution of Mercurochrome.

References Cited in the file of this patent

UNITED STATES PATENTS

| | | |
|---|---|---|
| 1,956,196 | Korab | Apr. 24, 1934 |
| 2,133,609 | Eustis | Oct. 18, 1938 |
| 2,497,928 | Cafiero | Feb. 21, 1950 |
| 2,620,080 | Tomlin | Dec. 2, 1952 |
| 2,893,345 | Kaufman | July 7, 1959 |